Oct. 18, 1955  J. R. BOUNDY ET AL  2,721,277
ELECTRICAL CONTROLLING APPARATUS
Filed March 28, 1952  3 Sheets-Sheet 3
FIG.2.A.
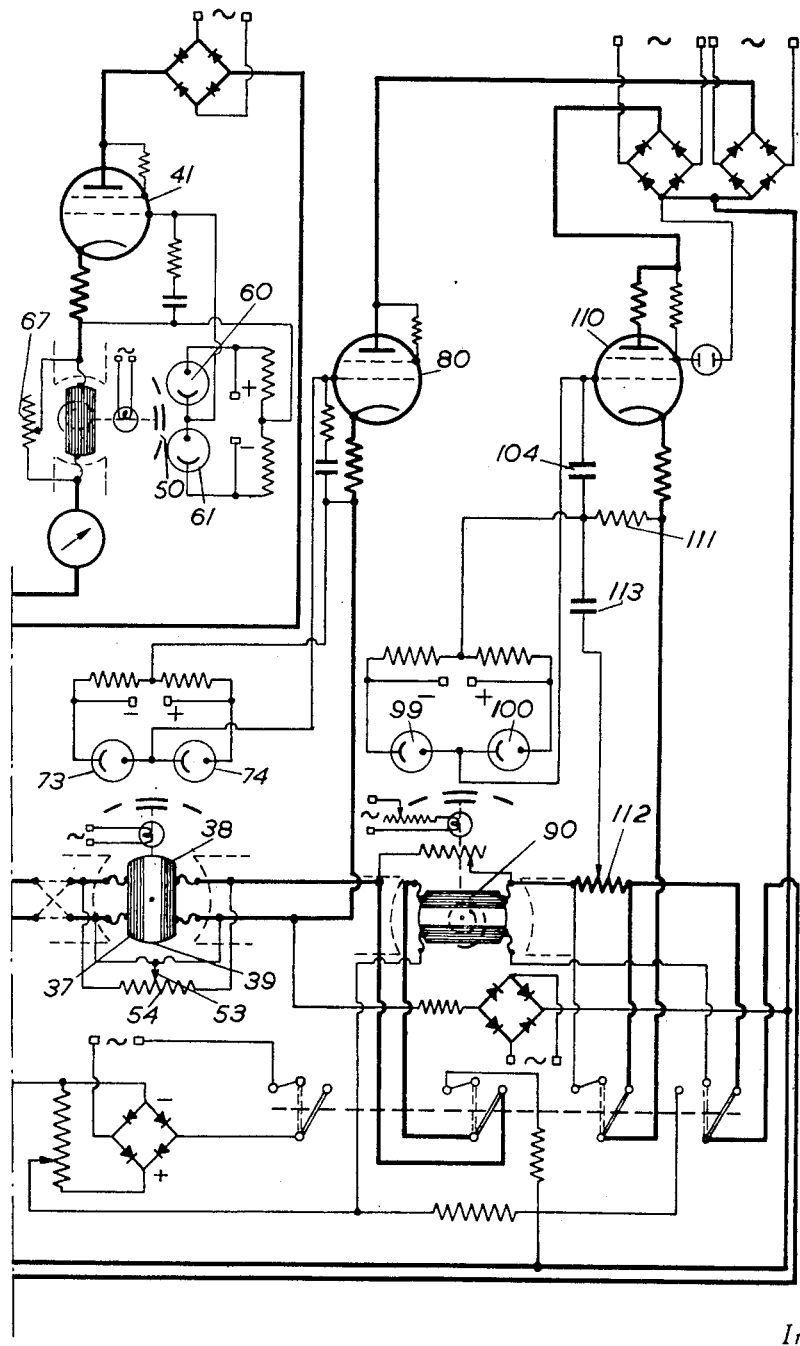
Inventors
James R. Boundy
Stephen A. Bergen
By Ralph B. Stewart
Attorney United States Patent Office 2,721,277
Patented Oct. 18, 1955

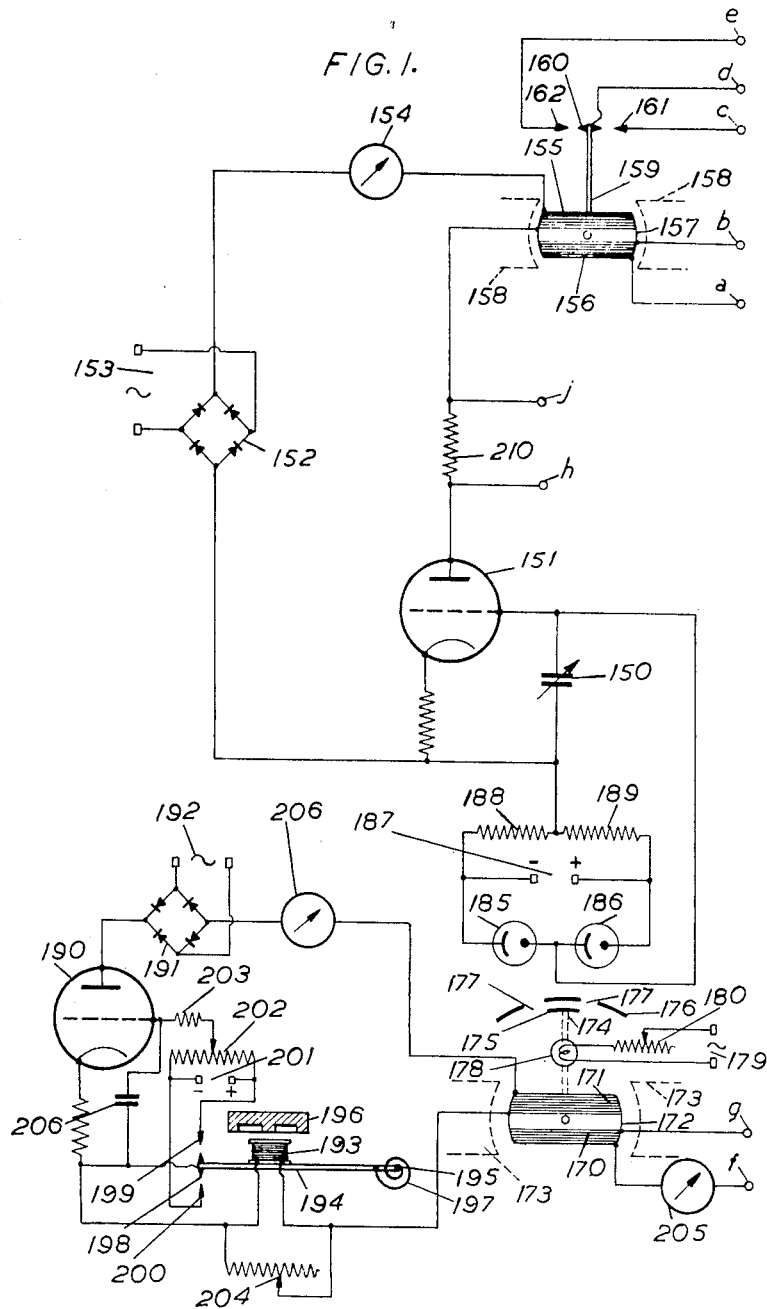

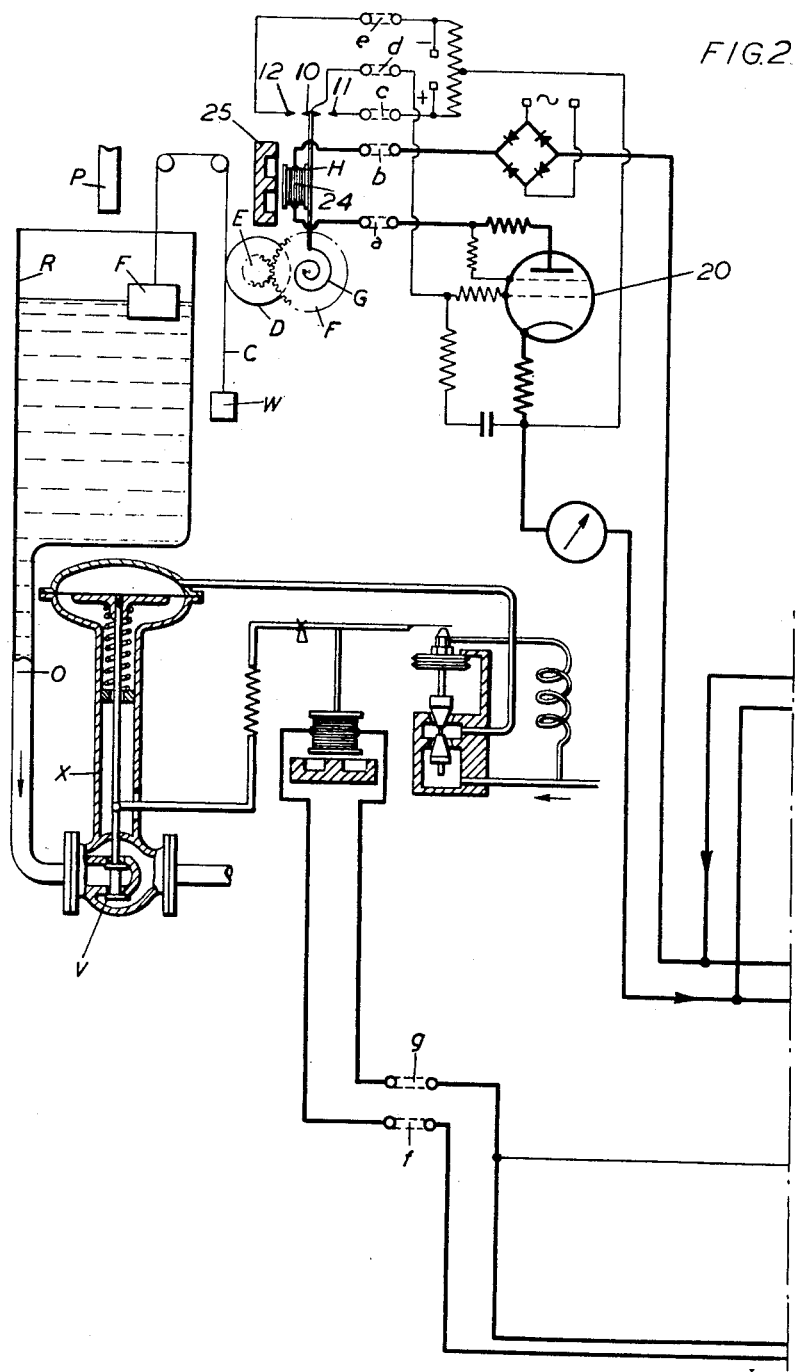

2,721,277

ELECTRICAL CONTROLLING APPARATUS

James Reilly Boundy and Stephen Archbold Bergen, London, England, assignors to Evershed & Vignoles Limited, London, England, a British company Application March 28, 1952, Serial No. 279,158

Claims priority, application Great Britain April 3, 1951

6 Claims. (Cl. 250—204)

This invention relates to testing controllers for regulating variables in process plants so as to adjust a variable at one point in a plant in accordance with variation in a further variable at some other point. The term "process plant" in this connection is one which is becoming generally accepted to denote any form of system in which the storage of a particular physical quantity is affected by two variables, one of which varies independently in accordance with conditions in a remote part of the system and the other of which must be regulated in dependence on the first in order that the quantity stored shall be maintained at a desired value or caused to vary in a desired manner. It will be used in this sense throughout the specification. The operation of such a system is then referred to as the "process."

The simplest example of such a plant is a liquid supply system in which the liquid stored in a tank or other reservoir depends both on the rate of inflow and on the rate of outflow. If one of these varies independently then the other must be regulated in dependence on it in order to maintain the liquid level at a desired value. A gas supply system requires similar control to maintain the gas pressure in a reservoir at a desired value. The quantity stored need not, however, be material but may take the form for example of heat or kinetic energy. For example the heat stored in an oven may vary with the external temperature or the material being heated, and under these conditions the fuel supply must be regulated accordingly. Again the kinetic energy and hence the speed of an electric turbo-generator will fluctuate with variations in the external load, and the steam supply to the turbine must then be regulated accordingly.

In order to explain the nature of the problem involved, the first of the examples mentioned above will be described in more detail. Liquid flows into a tank or other form of reservoir at a rate which may vary within wide limits in dependence upon conditions in another part of the system, and it is desired to provide an automatic control whereby an outlet valve may be adjusted to regulate the rate of outflow to correspond with the inflow. If the outflow remains constant and the inflow varies, the liquid level will also vary and this factor is employed to operate a controller for the outlet valve. The simplest form of controller for such a purpose is known as a proportional controller and operates to open the outlet valve in direct proportion to the liquid level. Thus if the inflow increases, the liquid level rises and the controller operates to open the outlet valve proportionately to establish a new state of equilibrium at a new raised level. If the inflow decreases the equilibrium is established at a reduced level.

In some cases, however, it is necessary to maintain the liquid level in the reservoir constant despite variations in the rates of flow and, in this case, it is necessary for the controller to operate in accordance with a further factor which requires to be proportional to the integral with respect to time of the variation of the liquid level from its mean or datum value. Such a controller is known as a "proportional plus integral" controller and provides a controlling effect which has components proportional both to the liquid level and to the integral with respect to time of its variation from its datum value. Thus if the rate of inflow increases to raise the liquid level above its datum value, both the proportional component and the integral component will be increased to open the outlet valve. The liquid level will then again gradually return to its datum value and the proportional component of the control effect will be restored to its initial value. The integral component will, however, retain its value so that the valve setting will be increased by an amount to allow for the increased rate of flow.

It is possible to increase the sensitivity of this form of controller until the liquid level oscillates about its datum position. In order to avoid this hunting, a third component may be introduced into the control effect of the controller and this third component is proportional to the first differential of the variation of the liquid level. Thus as the liquid level returns to its datum value under the control of the proportional and integral factors, the third factor opposes this return so that when the datum value is reached, the two influences balance out and the level remains fixed at its datum value until a further change of the rate of inflow occurs. This is an inherently stable form of controller and is commonly known as a "proportional plus integral plus derivative controller."

Although a specific form of system has been quoted as an example, these three forms of controller and further refinements operating on the broad principles set out, may be used to control a variety of forms of process plant, such as those already mentioned. Thus references in the specification to controllers are intended to include those working on these principles. The most obvious alternative to the system just described is one in which the rate of outflow is governed by the requirements of a remote part of the system while an inlet valve is controlled so as to regulate the rate of inflow accordingly. Again, two or more reservoirs may be connected in series, the liquid flowing under gravity from the bottom of one reservoir and in at the top of the next. The controller may then operate to adjust the outflow from the last reservoir to correspond with the inflow to the first.

The controller may be operated in a variety of ways, the two commonest forms of operation being pneumatic and electrical, and examples of the latter are described in applications Nos. 81,352, filed March 14, 1949, (now Patent No. 2,608,678) and 279,157, filed March 28, 1952. Whatever the form of controller, however, its input is proportional to the value of the stored quantity while its output contains the necessary components to control a regulator for the dependent variable.

There are optimum settings of the controller adjustments which give the most satisfactory operation for any particular process. Obviously when the controller is installed and connected to a process plant the various components may be adjusted to give the required controlling effect, but it is often necessary and also convenient to be able to test and adjust such a controller before it is installed in place. For example, it may be necessary for the manufacturers to test it before it is dispatched to customers, and again the customers may require to test it before actual installation. At present, the only method of testing such a controller is to provide some form of process plant which will respond to the controlling influence. Obviously, in the case of a fluid supply system, if large fluid reservoirs are involved, this testing apparatus will be very bulky, and when it is necessary to test a number of controllers for use in different situations, different test equipment is required, or alternatively, the same test equipment must be adjusted for the purpose.

It is the object of the present invention, therefore, to provide a form of apparatus which can simulate any form of process plant for use in testing the operation of a controller and to make any necessary adjustments to it. Such a piece of test equipment requires to be relatively small and compact and at the same time to be adjustable over a wide range to simulate a variety of conditions. It is desirable to be able to adjust the size of the reservoir for the stored quantity and also to use the equipment for testing a controller in which either of the variables may be independent while being able to adjust the value of this independent variable at will. Throughout the following description it will be assumed, for ease of terminology, that a liquid supply system is to be simulated. It will of course be understood, however, that any process plant can be simulated and that references to the liquid reservoir are equally applicable to any form of reservoir for a stored quantity.

According to the invention, the liquid reservoir is simulated by an electrical reservoir, that is to say, a condenser and the inflowing and outflowing streams of liquid constituting the two variables of the process plant are simulated by corresponding electric currents, the resultant of which serves to charge or discharge the condenser. The current representing the independent variable is arranged to be varied manually so as to represent any required external conditions, while the current representing the dependent variable is controlled by the output of the controller to be tested. Under these conditions, the voltage to which the condenser is charged then represents the liquid level in response to which the controller operates, and when the independent variable is altered at will the controller then regulates the dependent variable accordingly. In this way, the operation of any kind of process plant can be completely simulated and a complete test of the controller be carried out.

Since the input to the controller requires to be proportional to the liquid level (or other stored quantity) which is represented by the voltage across the reservoir condenser, this voltage may be applied to the grid of of a thermionic valve and the anode current of this valve may then be used to control the input to the controller.

In order to charge the reservoir condenser in accordance with the resultant of the currents representing the independent and the dependent variables, this resultant current may be used to control the balance of a current bridge of which the output current is then used to charge the condenser. For this purpose, the two currents are preferably caused to flow in opposition to one another in similar coils wound on a common former turning against the action of a spring in a permanent magnet field, and this former serves to control, in accordance with its angular position, the differential illumination of a pair of emission-type vacuum photo-cells. These photo-cells are connected in series across a source of direct current potential sufficient to produce the saturation current in the cells, and together with a pair of equal resistance arms, constitute the current bridge. Under conditions of saturation, the current passing through each cell is dependent only on its illumination and not on the applied voltage, so that the output current of the bridge is directly proportional to the difference of illumination of the two cells and hence to the angular deflection of the former. Since this in its turn is proportional to the difference in the current flowing in the two coils, the output of the bridge is itself proportional to the resultant of these currents and is thus able to be used for charging the reservoir condenser.

Apparatus in accordance with the invention will now be described in more detail by way of example with reference to the accompanying drawings, in which:

Figure 1 is a circuit diagram of apparatus for simulating a process plant;

Figure 2 is a portion of a circuit diagram of a controller for such a plant, and Figure 2A is the remainder of the circuit diagram of Figure 2.

The controller shown in Figure 2 is described in detail in the co-pending application Ser. No. 279,157, filed March 28, 1952, but for the present purpose the following brief description of its operation will suffice.

The controller system shown in Fig. 2 operates to control the liquid level in a reservoir R in accordance with changes in the inflow through a pipe P, which may vary with conditions in a remote part of the system and which thus constitutes the independent variable. In order to achieve this, the output from the controller is applied to an electro-pneumatic power receiver indicated generally at X, which adjusts the setting of an outlet valve V so that the outflow is regulated in accordance with the inflow to maintain the liquid level at its desired value. For this purpose, a float F on the surface of the liquid transmits the liquid level by way of a cord C weighted by means of a weight W to a rotary disc D around which it passes, and thence to a wheel F carrying a spring G. As the liquid level varies so a lever arm H carried by the spring G is rocked either to the right or left so that a contact 10 at its end engages one of a pair of fixed contacts 11 and 12. These control the grid potential of a thermionic tube 20, the anode current of which passes through a coil 24, co-operating with a pot magnet 25 to restore the balance of the arm H. Thus the anode current of the tube 20 is adjusted in accordance with changes in the liquid level. The pot magnet 25 is of conventional construction similar to the magnet of a dynamic type loud-speaker. In other words, the magnetic structure producing the field for coil 24 is in the form of an iron pot having a central pole extending from the bottom wall thereof in concentric relation with the annular pole carried by the outer wall of the pot and providing an annular air-gap in which the coil 24 is located.

The anode circuit of the tube 20 and the circuits from the fixed contact 11, from the moving contact 10 and from the fixed contact 12 include removable links $a$, $b$, $c$, $d$ and $e$ respectively. These five links between them carry the whole of the electrical input from the process plant consisting of the liquid reservoir to the controller, and may be disconnected in order to enable a corresponding input from testing apparatus to be substituted for that of the process plant.

The anode current of the tube 20 flows in opposition to the anode current of a tube 41 through a coil 37. The anode current of the tube 41 is held constant by means of a device comprising a pair of photo-electric cells 60 and 61 and is adjusted by means of a shunt 67. This shunt is set so that the anode current of the tube 41 represents the desired value of the liquid level in the reservoir R. Thus when the liquid level is at its desired value, the anode current of the tube 20 is equal to that of the tube 41 and no current flows in the coil 37. Under all other conditions, the current in the coil 37 represents the error in the system.

A second coil 38 is wound on the same former or rotor 39 as the coil 37 and has its current adjusted by a device comprising a pair of photo-electric cells 73 and 74, which control the grid of a thermionic tube 80 whose anode current supplies the coil 38. Thus the currents in the coils 37 and 38 are adjusted to be equal, and by variation of a tapping 53 on a shunting resistance 54, a proportional band setting is achieved whereby the anode current of the tube 80 is given any desired ratio to the current in the coil 37.

After flowing through the coil 38, the anode current of the tube 80 flows through a further coil 90, which controls the illumination of a pair of photo-electric cells 99 and 100 constituting two arms of a current bridge. The output of this bridge, which is proportional to the current in the coil 90, is used to charge a storage condenser 104 connected between the grid and cathode of a thermionic tube 110. Since the charging current to the condenser 104 is always proportional to the anode current of the tube 80, the charge on the condenser represents the integral with respect to time of this current and the anode current of the tube 110 therefore contains a corresponding integral component.

The anode current of the tube 80 next flows through a resistance 112 forming part of a differentiating network also comprising a resistance 111 and a condenser 113. A voltage proportional to the derivative of the anode current of the tube 80 thus appears across the resistance 111 and is added to the voltage across the condenser 104 so that the anode current of the tube 110 contains a derivative as well as an integral component. The anode current of the tube 110, together with the anode current of the valve 80, constitutes the output of the controller which is used to control the power receiver X. The setting of the outlet valve V is thereby adjusted to a value proportional to the output of the controller. The output lines are interrupted by links $f$ and $g$, which can be disconnected so that the output of the controller can be alternatively supplied to a test unit consisting of the apparatus shown in Figure 1.

For this purpose the links in the controller are connected to the corresponding terminals $a$ to $g$ on the test unit which is therefore inserted in place of the process plant. The liquid reservoir R constituting part of the process plant normally controlled by the controller, is represented by a reservoir condenser 150, the voltage across which corresponds to the liquid level in the reservoir. This voltage across the condenser 150 is applied between the grid and cathode of a thermionic tube 151 whose anode circuit is supplied by a full wave rectifier 152 connected to a source of alternating current supply 153. The anode current of the tube 151 as indicated by an ammeter 154 is therefore proportional to the voltage across the condenser 150, or in other words, is proportional to the measured value of the stored quantity of the process plant. Thus the ammeter 154 gives a direct reading of this measured value.

The anode current is caused to flow through a coil 155 which is one of a pair of similar coils 155 and 156 wound on a common former or rotor 157 to turn between permanent magnet pole pieces 158. The rotor 157 carries a light arm 159 provided with a moving contact 160 playing between fixed contacts 161 and 162. These contacts 160, 161 and 162 correspond in their function to the contacts 10, 11 and 12 of Figure 2 and by virtue of the connections made by the links $c$, $d$ and $e$ serve to control the anode current of the tube 20. This flows by way of the links $a$ and $b$ through the coil 156 and is automatically adjusted until it equals the current in the coil 155. Thus once again the anode current of the tube 20 represents the measured value of the stored quantity and behaves in exactly the same way as if the controller were connected to a process plant.

In a normal process plant, the magnitude of the stored quantity is affected by both the independent and the dependent variables, i. e., in the example of Figure 2 by the independent inflow through the pipe P and the dependent outflow through the valve V.

In the apparatus of Figure 1, the output of the controller which would normally be fed to the power receiver X is passed by way of the terminals $f$ and $g$ to a coil 170 which is one of a pair of similar coils 170 and 171 wound on a common former or rotor 172 turning between permanent magnet pole pieces 173. The coil 171 is supplied with a manually adjustable current, which is proportional to the independent variable, while the current flowing in the coil 170 is proportional to the dependent variable. These two coils are connected to oppose one another so that the resultant torque on the former rotor 172 represents the resultant inflow or outflow of liquid to the reservoir R, or in the general case, of the stored quantity of the process plant.

The former rotor 172 is controlled by opposing spiral springs, which are not shown in the drawing, but which in the absence of currents flowing in the coils tend to centralise the former rotor. The former rotor carries a light arm 174 on which is mounted a shutter 175 co-operating with a part-cylindrical screen 176 formed with a pair of openings 177. These openings allow light from a lamp 178, energised from a source of alternating current 179 by way of a variable resistance 180, to fall on a pair of emission-type vacuum photo cells 185 and 186. These cells are connected in series across a source of direct current potential 187 sufficient to produce the saturation current through the cells, and together with a pair of equal resistance arms 188 and 189 constitute a current bridge.

When the shutter 175 is in the central position, equal quantities of light fall on the two cells, but as soon as the shutter 175 is deflected in one direction or the other due to a preponderance of current in either the coil 170 or in the coil 171, one of the cells is illuminated more than the other, the bridge is unbalanced and an output current proportional to the difference of illumination is produced. Since the difference of illumination is proportional to the deflection of the shutter 175, and this in its turn is proportional to the difference in the currents of flowing in the two coils 170 and 171, the output current of the bridge is itself proportional to the difference of these two currents. This output current is then used to charge the reservoir condenser 150 so that in this way the analogy is completed, because, as already mentioned, the difference between the currents in the coils 170 and 171 represents the resultant flow into or out of the reservoir.

The current flowing in the coil 171 is produced by means of a constant current circuit comprising a thermionic tube 190 whose anode circuit is supplied from a full wave rectifier 191 by way of a source of alternating current 192. Before flowing through the coil 171, the anode current flows through a coil 193 mounted on an arm 194 pivoted at 195. The coil 193 co-operates with a pot magnet 196 and acts in opposition to a spiral spring 197. When the attraction between the coil 193 and the pot magnet 196 equals the effect of the spring 197, a moving contact 198 on the left-hand end of the arm 194 is midway between fixed contacts 199 and 200 connected respectively to the positive and negative terminals of a source of direct current 201. The moving contact 198 is connected to the cathode of the tube 190, while the mid-point of a resistance 202 connected across the source of direct current 201 is connected to the grid of the valve through a resistance 203.

If the anode current of the tube tends to increase, the attraction on the coil 193 is increased and the contact 198 engages the contact 199. This connects the positive pole of the source 201 to the cathode of the tube 190, charging a grid condenser 206 and reducing the potential of the grid in relation to that of the cathode and thus also reducing the anode current of the tube till its constant value is again reached. Any decrease in the anode current results in an increase in the grid potential with a corresponding increase of the anode current to its pre-set value. The coil 193 is provided with a variable shunt 204 which controls the proportion of the anode current passing through the coil. The current in the coil 193 is maintained constant and by adjustment of the shunt 204, the current flowing in the coil 171 can be preset to any required value.

The currents flowing in the coils 170 and 171 are indicated respectively by ammeters 205 and 206 which thus show at any time the values of the dependent and independent variables. When simulating the liquid reservoir of Figure 2, the readings of the ammeters 205, 206 and 154 represent the setting of the valve V, the inflow from the pipe P and the liquid level in the reservoir R, so that a complete record of the behavior of the plant may be kept. If under steady conditions, the shunt 204 is adjusted to represent an abrupt change in the independent variable, the rate of response of the controller in restoring the liquid level to its desired value may readily be checked and any necessary adjustments may then be made.

As shown in Figure 1, the condenser 150 is variable and by adjusting its capacity the size of reservoir simulated is correspondingly varied. A similar effect is obtained by adjustment of the resistance 180 controlling the brightness of the lamp 178. If the lamp is made brighter, a larger output is obtained from the photo cell bridge for a given deflection of the shutter 175 and this produces a greater rate of charge of the condenser 150 for a given resultant current flowing in the coils 170 and 171. In other words, the effective size of the reservoir is decreased. When simulating any particular size of reservoir, therefore, it is convenient to make coarse adjustments by varying the capacity of the condenser 150 and fine adjustments by varying the resistance 180.

The reservoir condenser can, of course, simulate only one fluid reservoir at any one time, so that if it is desired to reproduce the conditions of two separate fluid reservoirs connected in series, it is necessary to use two separate test units each of the kind shown in Figure 1. For purposes of explanation it is again most convenient to consider a specific problem. In this case, liquid may be imagined to flow through a controlled inlet valve into one reservoir; then out of the bottom of this reservoir and in at the top of a second; and finally out of the bottom of the second reservoir at a rate which is independently variable. The problem is to adjust the rate of inflow into the first reservoir to correspond with the rate of outflow from the second, and for this purpose a controller responding to the liquid level in the second reservoir is used to control the inlet valve to the first.

The unit representing the first reservoir has its dependent variable, that is to say its rate of inflow regulated by the controller, and the output of the controller is thus connected to its coil 170. Its rate of outflow is governed by two factors, the liquid level in the reservoir and the value of the constriction provided by the outlet pipe to the second reservoir. If this second factor is fixed, then there is no independent variable controlling the outflow. If, however, there is a manually adjustable valve or cock in this line, then this will have an independent control on the rate of outflow. The setting of the shunt 204 thus represents the constrictive value of the outlet pipe and for any given test may be kept at a fixed value.

With this constriction maintained at a fixed value the inflow into the second reservoir, which is, of course, the outflow from the first reservoir, is governed only by the head in the first reservoir, and this constitutes the first of the variables for the second reservoir. The head in question is represented by the anode current of the tube 151 controlled by the reservoir condenser 150 in the first unit, and a current proportional to this is therefore required to flow in the coil 170 of the second unit. Thus the coils 155 and 156 and the terminals a to e of the first unit are not used. To avoid the need for disconnecting these from the circuit, a resistance 210 is provided in the anode circuit, having terminals h and j connected across its ends. A voltage proportional to the anode current of the valve 151 is thus available across the terminals h and j, which are therefore connected to the terminals f and g of the second unit.

The current in the coil 171 of the second unit represents the outflow from the second reservoir, and this is an independent variable which is set manually by means of the shunt 204 of the second unit. The anode current of the tube 151 controlled by the reservoir condenser 150 of the second unit represents the liquid level of the second reservoir, and this current is used as the input to the controller. In other words the terminals a to e of the second unit are connected to the controller. The output of the controller is then used, as already described, to supply the coil 170 of the first unit.

In this way, two units connected in series provide a complete simulation of two liquid reservoirs also connected in series. The reservoir condensers 150 of the two units may be adjusted to represent any sizes of liquid reservoir and the two shunts 204 can be adjusted respectively to represent any required value of the constriction between the reservoirs, and also to represent any possible conditions of outflow from the second reservoir. It will readily be understood that in the same way, three or more such units could be connected in series to represent an equivalent number of liquid reservoirs. Also, of course, such series connection can be used to simulate equivalent series connection of any forms of process plant.

Although the apparatus has been described for use in connection with the controller illustrated in the co-pending application Serial No. 279,157, it is clear that it is equally useful in connection with other forms of controller, such for example as that shown in the co-pending application 81,352, filed March 14, 1949 (Patent No. 2,608,678). If the controller is pneumatically operated, it is only necessary to provide devices, which are well known, for the interconversion of pneumatic to electrical output and vice versa.

We claim:

1. Apparatus for use in testing a controller having an input and an output, comprising in combination a condenser, means responsive to the voltage of said condenser for energizing the input to said controller, a source of manually variable direct current, means controlled by said controller for producing a direct current proportional to the output of said controller, and means controlled by said two currents for charging said condenser with a current varying with the difference between the values of said two currents.

2. Apparatus for use in testing a controller having an input and an output, comprising in combination a thermionic tube having anode, grid and cathode elements, a source of direct current supplying the anode circuit of said tube, means controlled by said anode current for energizing the input to said controller, a variable condenser connected between the grid and the cathode of said tube, means for charging said condenser, a manually variable source of direct current, means controlled by said controller and producing a direct current proportional to the output of said controller, and means responsive to the difference between said manually variable current and said proportional current for controlling said charging means.

3. Apparatus for use in testing a controller having an input and an output, comprising in combination a thermionic tube having anode, grid and cathode elements, a source of direct current supplying the anode circuit of said tube, means controlled by said anode current for energizing the input to said controller, a condenser connected between the grid and cathode of said tube, a current bridge having its output connected to charge said condenser, a pair of coils, rotor means mounting said coils for rotation together in a magnetic field, a manually variable source of direct current, means connecting said manually variable source to said first coil, means for supplying a direct current proportional to the output of said controller to said second coil in a direction to produce a torque on said rotor means in opposition to that produced by the current in said first coil, and means responsive to the angular position of said coils for controlling the balance of said bridge.

4. Apparatus for use in testing a controller as claimed in claim 3, in which said current bridge comprises a pair of emission-type vacuum photoelectric cells, a source of direct current voltage sufficient to produce the saturation current in said cells, said cells being connected in series across said source of direct current voltage, a pair of equal resistance arms, means for illuminating said cells and means controlled by the angular position of said coils for varying the proportion of illumination falling on each cell.

5. Apparatus for use in testing a controller as claimed in claim 4 in which said means for illuminating said cells comprises an electric lamp and means for varying the brightness of said lamp.

6. In apparatus for simulating a process plant in which a stored physical quantity varies in accordance with an independently variable quantity and a dependently variable quantity controlled in accordance with variations of said independently variable quantity, the combination of a thermionic tube having anode, grid and cathode elements, a source of direct current supplying the anode circuit of said tube, said anode current representing the magnitude of said stored quantity, a variable condenser connected between the grid and cathode of said tube, a pair of emission-type vacuum photo-electric cells, a source of direct current voltage sufficient to produce the saturation current in said cells, said cells being connected in series across said source of direct current voltage, a pair of equal resistances, said resistances being connected so as to form with said photo-electric cells a current bridge having its output connected to charge said condenser, an electric lamp arranged to illuminate said cells, means for controlling the brightness of said lamp, a shutter interposed between said lamp and said cells, a rotor connected to said shutter, a pair of coils wound on said rotor, means mounting said rotor for rotation in a magnetic field, rotation of said rotor serving to move said shutter to control the proportion of illumination falling on each of said cells, a manually variable source of direct current, means connecting said manually variable source to said first coil, the current in said first coil representing said independently variable quantity, and means for supplying a current representing said dependently variable quantity to said second coil in a direction to produce a torque on said rotor in opposition to that produced by the current in said first coil.

References Cited in the file of this patent
UNITED STATES PATENTS

| | | |
|---|---|---|
| 2,236,255 | Young | Mar. 25, 1941 |
| 2,336,624 | McIllvaine | Dec. 14, 1943 |
| 2,371,590 | Brooke, Jr. et al. | Mar. 13, 1945 |
| 2,431,899 | Wolf et al. | Dec. 2, 1947 |
| 2,608,678 | Marchment et al. | Aug. 26, 1952 |